US012663953B2

(12) United States Patent
Chen et al.

(10) Patent No.: US 12,663,953 B2
(45) Date of Patent: Jun. 23, 2026

(54) SMART SPACE SYSTEM

(71) Applicant: Jorjin Technologies Inc., New Taipei City (TW)

(72) Inventors: Kuan Chun Chen, New Taipei City (TW); Hung Jung Chen, New Taipei City (TW); Cong Yueh Tai, New Taipei City (TW); Chi-Han Wang, New Taipei City (TW)

(73) Assignee: Jorjin Technologies Inc., New Taipei City (TW)

( * ) Notice: Subject to any disclaimer, the term of this patent is extended or adjusted under 35 U.S.C. 154(b) by 124 days.

(21) Appl. No.: 18/676,530

(22) Filed: May 29, 2024

(65) Prior Publication Data

US 2024/0402975 A1      Dec. 5, 2024

Related U.S. Application Data

(60) Provisional application No. 63/469,528, filed on May 29, 2023.

(51) Int. Cl.
*G06F 3/14* (2006.01)
*G06F 3/01* (2006.01)
*H04N 9/31* (2006.01)

(52) U.S. Cl.
CPC ............ *G06F 3/1446* (2013.01); *G06F 3/012* (2013.01); *H04N 9/3147* (2013.01)

(58) Field of Classification Search
CPC ...... G06F 3/1446; G06F 3/012; H04N 9/3147
USPC ......................................................... 348/51
See application file for complete search history.

(56) References Cited

U.S. PATENT DOCUMENTS

| | | | | |
|---|---|---|---|---|
| 2013/0181901 | A1 | 7/2013 | West | |
| 2018/0151098 | A1* | 5/2018 | Tomita | G09G 3/002 |
| 2018/0293041 | A1 | 10/2018 | Harviainen | |
| 2018/0316856 | A1* | 11/2018 | Kimber | H04N 21/4788 |
| 2019/0044703 | A1 | 2/2019 | Smith | |
| 2019/0154871 | A1* | 5/2019 | Leduc | G08B 13/1895 |

(Continued)

FOREIGN PATENT DOCUMENTS

| | | |
|---|---|---|
| CN | 206444151 | 8/2017 |
| CN | 112384880 | 2/2021 |

(Continued)

OTHER PUBLICATIONS

"Office Action of Taiwan Counterpart Application", issued on Oct. 14, 2024, p. 1-p. 10.

(Continued)

*Primary Examiner* — Allen C Wong
(74) *Attorney, Agent, or Firm* — JCIPRNET

(57) ABSTRACT

A smart space system includes: a cabin, including: a bottom surface; and a first screen, located on a side wall of the cabin and connected to the bottom surface; an interactive human-machine interface, including: a display system, having an imaging device, wherein the imaging device is configured to project multiple multimedia images onto the first screen; and a controller, signal-connected to the interactive human-machine interface to issue a control command to the interactive human-machine interface, so that the multimedia images are connected to form a first continuous image, so that images of the first continuous image appear coherent on the first screen.

17 Claims, 7 Drawing Sheets

(56) References Cited

U.S. PATENT DOCUMENTS

| | | | |
|---|---|---|---|
| 2019/0182534 A1* | 6/2019 | Matsuoka | H04N 21/44 |
| 2019/0206131 A1* | 7/2019 | Kamal | G06T 7/74 |
| 2020/0064533 A1* | 2/2020 | Miyazaki | F21V 15/01 |
| 2020/0164270 A1* | 5/2020 | Lin | A63F 13/26 |
| 2020/0225737 A1* | 7/2020 | Limor | G06T 15/60 |
| 2020/0265795 A1* | 8/2020 | Onishi | G09G 5/14 |
| 2020/0276510 A1 | 9/2020 | Weston | |
| 2022/0164156 A1* | 5/2022 | Fitzgerald | H04N 23/698 |
| 2022/0353481 A1* | 11/2022 | Sibley | H04N 13/305 |
| 2023/0209234 A1* | 6/2023 | Kim | H04R 17/00 |
| | | | 381/388 |

FOREIGN PATENT DOCUMENTS

| | | |
|---|---|---|
| CN | 109416842 | 8/2023 |
| JP | 2008182706 | 8/2008 |
| JP | 2017538990 | 12/2017 |
| JP | 2018200389 | 12/2018 |
| JP | 2022050305 | 3/2022 |
| KR | 102358997 | 2/2022 |
| TW | 201005569 | 2/2010 |
| TW | 201635272 | 10/2016 |
| TW | I746466 | 11/2021 |

OTHER PUBLICATIONS

"Office Action of Japan counterpart Application", issued on Oct. 17, 2025, p. 1-p. 3.
"Office Action of Japan Counterpart Application", issued on May 8, 2025, p. 1-p. 5.
"Office Action of Taiwan Counterpart Application", issued on Feb. 5, 2026, p. 1-p. 11.

\* cited by examiner

SMART SPACE SYSTEM

CROSS-REFERENCE TO RELATED APPLICATION

This application claims the priority benefit of U.S. provisional application Ser. No. 63/469,528, filed on May 29, 2023. The entirety of the above-mentioned patent application is hereby incorporated by reference herein and made a part of this specification.

TECHNICAL FIELD

The disclosure relates to a smart space system.

DESCRIPTION OF RELATED ART

Immersive experience refers to an experience that allows a user to be immersed in a certain scenario. When the user is in a specific space, the specific space may be turned into a specific environment by image projection, allowing the user to have an immersive feeling. However, when images are projected in the specific space, the projection of the images in the specific space often destroys the sense of integrity felt by the user due to image discontinuity. Also, the user cannot interact with the images, which also affects the immersive experience.

SUMMARY

The disclosure provides a smart space system, which is configured to provide a continuous image, and a user may interact with the continuous image.

A smart space system of the disclosure includes: a cabin, including: a bottom surface; and a first screen, located on a side wall of the cabin and connected to the bottom surface; an interactive human-machine interface, including: a display system, having an imaging device, wherein the imaging device is configured to project multiple multimedia images onto the first screen; and a controller, signal-connected to the interactive human-machine interface to issue a control command to the interactive human-machine interface, so that the multimedia images are connected to form a first continuous image, so that images of the first continuous image appear coherent on the first screen.

In an embodiment of the disclosure, the first screen includes at least two planar projection surfaces. The at least two planar projection surfaces include a first planar projection surface and a second planar projection surface. A bottom portion of the first planar projection surface is connected to a first side of the bottom surface. A bottom portion of the second planar projection surface is connected to a second side connected to the first side of the bottom surface. The second planar projection surface is connected to the first planar projection surface.

In an embodiment of the disclosure, the imaging device includes at least one projection apparatus, and the at least one projection apparatus includes a first projection apparatus and a second projection apparatus. The first projection apparatus projects a first multimedia image among the multimedia images onto the first planar projection surface, and the second projection apparatus projects a second multimedia image among the multimedia images onto the second planar projection surface. The controller controls the first projection apparatus and the second projection apparatus, so that the first multimedia image and the second multimedia image are connected to form the first continuous image. The at least one projection apparatus further uses a single projection apparatus to simultaneously correspond to the first planar projection surface and the second planar projection surface to form the first continuous image.

In an embodiment of the disclosure, the at least two planar projection surfaces further include a third planar projection surface. A bottom portion of the third planar projection surface is connected to a third side connected to the first side of the bottom surface, and the third planar projection surface is connected to the first planar projection surface. The at least one projection apparatus further includes a third projection apparatus. The third projection apparatus projects a third multimedia image among the multimedia images onto the third planar projection surface. The controller controls the first projection apparatus, the second projection apparatus, and the third projection apparatus, so that the first multimedia image, the second multimedia image, and the third multimedia image are connected to form the first continuous image.

In an embodiment of the disclosure, the at least two planar projection surfaces further include a fourth planar projection surface. A bottom portion of the fourth planar projection surface is connected to a fourth side of the bottom surface, the fourth side is respectively connected to the second side and the third side, and the fourth planar projection surface is respectively connected to the second planar projection surface and the third planar projection surface. The at least one projection apparatus further includes a fourth projection apparatus. The fourth projection apparatus projects a fourth multimedia image among the multimedia images onto the fourth planar projection surface. The controller controls the first projection apparatus, the second projection apparatus, the third projection apparatus, and the fourth projection apparatus, so that the first multimedia image, the second multimedia image, the third multimedia image, and the fourth multimedia image are connected to form the first continuous image.

In an embodiment of the disclosure, the cabin further includes a second screen located on the bottom portion of the cabin or a top portion of the cabin, and the second screen is connected to the first screen. The second screen includes a fifth planar projection surface. A bottom portion of the fifth planar projection surface is connected to a first side of the fifth planar projection surface. The bottom portion of the second planar projection surface is connected to a second side connected to the first side of the fifth planar projection surface. The at least one projection apparatus includes a fifth projection apparatus. The fifth projection apparatus projects a fifth multimedia image among the multimedia images onto the fifth planar projection surface. The controller controls the first projection apparatus, the second projection apparatus, and the fifth projection apparatus, so that the first multimedia image, the second multimedia image, and the fifth multimedia image are connected to form a second continuous image, so that images of the second continuous image appear coherent on the first screen and the second screen.

In an embodiment of the disclosure, on the first screen and the second screen, the fourth continuous image moves along a first direction perpendicular to a normal line of the bottom surface, moves along a second direction perpendicular to the normal line and perpendicular to the first direction, moves along a third direction parallel to the normal line, or respectively rotates along the first direction, the second direction, or the third direction.

In an embodiment of the disclosure, the first screen includes a curved projection surface. A bottom portion of the curved projection surface is connected to the first side of the bottom surface.

In an embodiment of the disclosure, the first screen includes a full annular projection surface. A bottom portion of the full annular projection surface is connected to a side of the bottom surface.

In an embodiment of the disclosure, a material of the first screen includes glass, glass with adjustable transparency, wood, and metal.

In an embodiment of the disclosure, a part of the at least one projection apparatus is disposed on the first screen.

In an embodiment of the disclosure, a part of the at least one projection apparatus is disposed on at least one of the at least two planar projection surfaces.

In an embodiment of the disclosure, the interactive human-machine interface further includes a head-mounted display device including a function of augmented reality, mixed reality, virtual reality, or a combination thereof.

In an embodiment of the disclosure, the interactive human-machine interface further includes at least one first lens module disposed in the cabin and signal-connected to the controller to track a position of the head-mounted display device.

In an embodiment of the disclosure, the interactive human-machine interface further includes a motion capture module configured to capture a movement trajectory of a target to generate a motion capture result, the motion capture module transmits the motion capture result signal to the controller, and the controller correspondingly changes the multimedia images of the imaging device according to the motion capture result.

In an embodiment of the disclosure, the motion capture module includes at least one millimeter wave radar or at least one camera.

In an embodiment of the disclosure, the controller includes: a communication device, configured to be communicatively connected to the interactive human-machine interface and an Internet; a processor, electrically connected to the communication device and providing a function of connecting the cabin and the Internet; and a cloud central processing system, communicatively connected to the processor. The cloud central processing system determines contents of the multimedia images according to a command of the processor, and transmits the multimedia images to the display system via the communication device.

In an embodiment of the disclosure, the cabin further includes a desktop connected to the bottom surface or the first screen. The desktop is electrically connected to the controller to input a command to the controller to change a status of the controller.

Based on the above, the smart space system provided by the disclosure may span the side walls and the bottom surface of the cabin to form a seamless continuous image. A user may also interact with the continuous image, such as translating or rotating the continuous image with the motion of the user, so that the user can obtain a better user experience in the smart space system.

DESCRIPTION OF THE EMBODIMENTS

Figure 1:
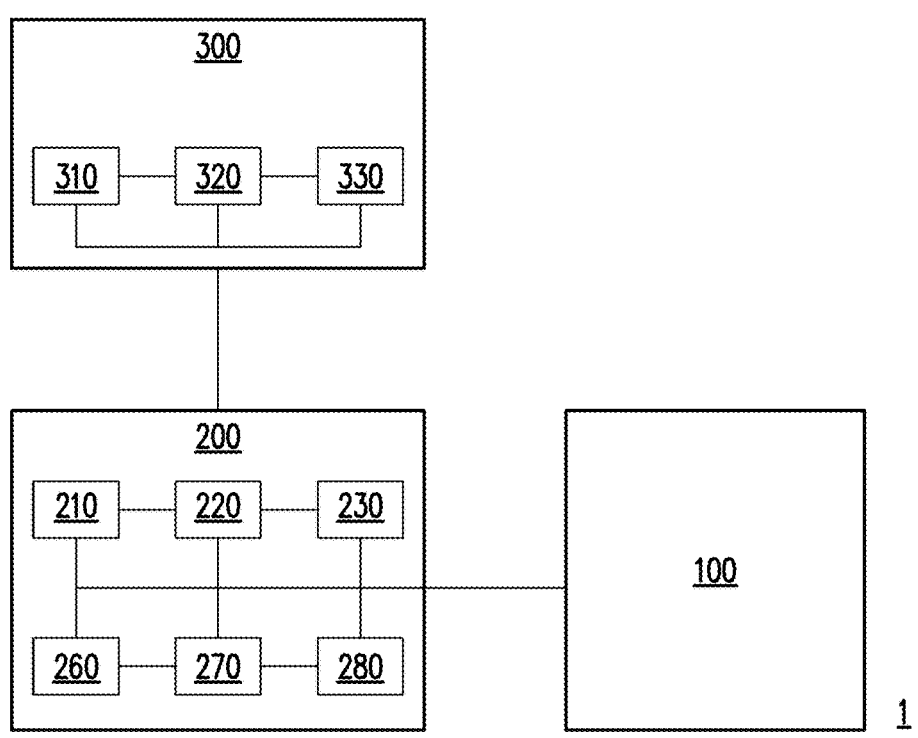
FIG. 1 is a block diagram of a smart space system according to an embodiment of the disclosure.

FIG. 1 is a block diagram of a smart space system according to an embodiment of the disclosure. As shown in FIG. 1, a smart space system 1 includes a cabin 100, an interactive human-machine interface 200, and a controller 300.

The cabin 100 includes a bottom surface and a first screen. The specific contents of the devices will be explained in the following paragraphs.

The interactive human-machine interface 200 includes the interactive human-machine interface 200 includes a display system 210 having an imaging device 220. The imaging device 220 is configured to project multiple multimedia images on the first screen. The specific contents of the devices will be explained in the following paragraphs.

The interactive human-machine interface 200 further includes a projection apparatus 230, a head-mounted display device 260, at least one first lens module 270, and a motion capture module 280. The specific contents of the devices will be explained in the following paragraphs.

The controller 300 is signal-connected to the interactive human-machine interface 200 to issue a control command to the interactive human-machine interface 200, so that the multimedia images are connected to form a first continuous image, so that the images of the first continuous image appear coherent on the first screen. Specifically, the controller 300 includes a communication device 310, a processor 320, and a cloud central processing system 330. The specific contents of the devices will be explained in the following paragraphs.

Figure 2:
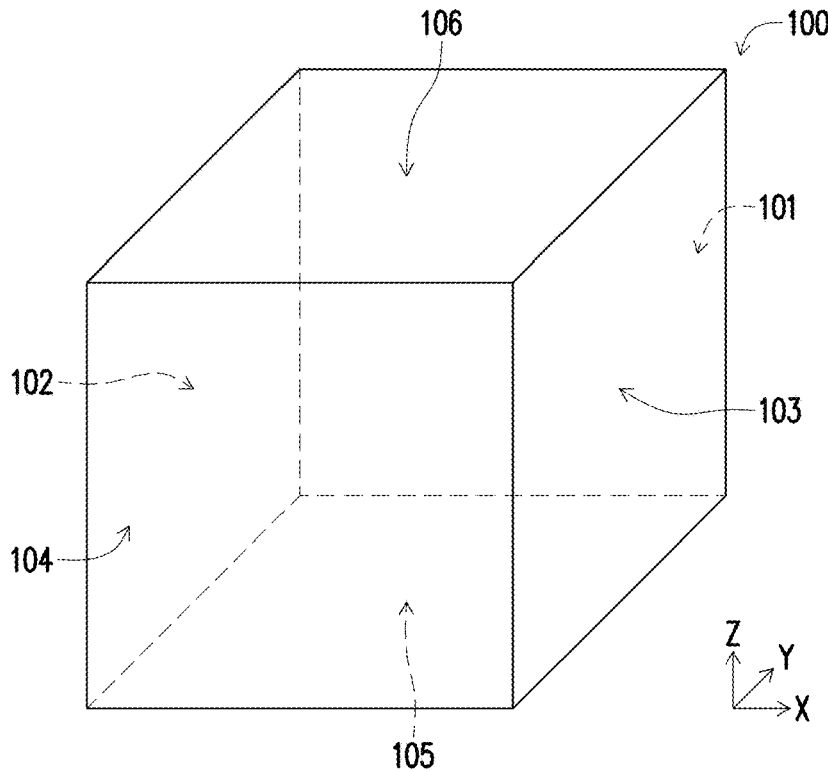
FIG. 2 to FIG. 11 are schematic diagrams of a smart space system according to embodiments of the disclosure.

FIG. 2 is a schematic diagram of a smart space system according to an embodiment of the disclosure. As shown in FIG. 2, the cabin 100 is a space including side walls 101, 102, 103, and 104, a bottom surface 105, and a top surface 106. In the embodiment, the bottom surface 105 is a rectangle, but the bottom surface 105 may also be other shapes, such as a polygon, a polygon with one or more sides being curves, or other suitable shapes, but the disclosure is not limited thereto. In the embodiment, bottom portions of the side walls 101, 102, 103, and 104 are respectively connected to corresponding sides of the bottom surface 105, and top portions of the side walls 101, 102, 103, and 104 are respectively connected to corresponding sides of the top surface 106.

Figure 3:
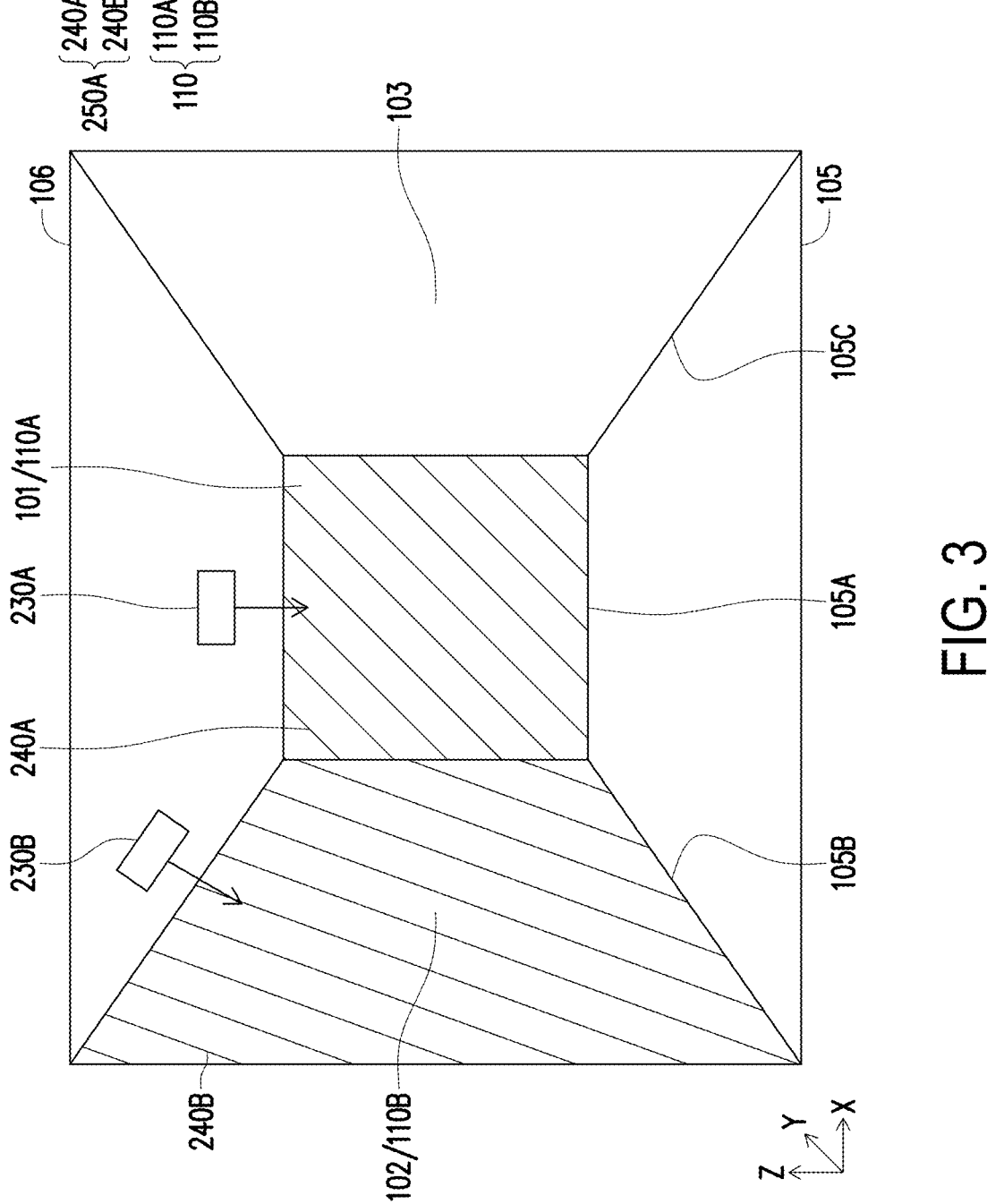

FIG. 3 is a schematic diagram of a smart space system according to an embodiment of the disclosure. As shown in FIG. 3, FIG. 3 shows a partial structure of the cabin 100. FIG. 3 shows the side walls 101, 102, and 103, the bottom surface 105, and the top surface 106 of the cabin 100.

The first screen 110 is located on the side wall of the cabin 100 and is connected to the bottom surface 105. Specifically, the first screen 110 includes at least two planar projection surfaces. In the embodiment shown in FIG. 3, the at least two planar projection surfaces include a first planar projection surface 110A and a second planar projection surface 110B.

As shown in FIG. 3, the first planar projection surface 110A is located on the side wall 101. Specifically, the first planar projection surface 110A is located on a surface of the side wall 101 located inside the cabin 100. A bottom portion of the first planar projection surface 110A is connected to a first side 105A of the bottom surface 105. In other words, the first planar projection surface 110A extends downward to the bottom surface 105.

As shown in FIG. 3, the second planar projection surface 110B is located on the side wall 102 connected to the side wall 101. Specifically, the second planar projection surface 110B is located on a surface of the side wall 102 located inside the cabin 100. A bottom portion of the second planar projection surface 120A is connected to a second side 105B connected to the first side 105A of the bottom surface 105. In other words, the second planar projection surface 110B extends downward to the bottom surface 105. In addition, the second planar projection surface 110B is connected to the first planar projection surface 110A.

As shown in FIG. 3, the cabin 100 further includes the imaging device 220. The imaging device 220 includes at least one projection apparatus 230 configured to project the multimedia images onto multiple planar projection surfaces of the first screen.

As shown in FIG. 3, the projection apparatus 230 includes a first projection apparatus 230A and a second projection apparatus 230B respectively corresponding to the first planar projection surface 110A and the second planar projection surface 110B. In the embodiment shown in FIG. 3, the first projection apparatus 230A and the second projection apparatus 230B are disposed on the top surface 106 to prevent interfering with the images projected onto the first planar projection surface 110A and the second planar projection surface 110B. In other embodiments, the first projection apparatus 230A and the second projection apparatus 230B may also be disposed at other suitable positions. For example, the first projection apparatus 230A may be disposed on a top portion of a side surface 101, the second projection apparatus 230B may be disposed on a top portion of a side surface 102, and the first projection apparatus 230A and the second projection apparatus 230B respectively project downward onto the first planar projection surface 110A and the second planar projection surface 110B. In other embodiments, the first projection apparatus 230A may project downward onto the first planar projection surface 110A and the second planar projection surface 110B, and the second projection apparatus 230B may additionally project downward onto the second planar projection surface 110B. In some embodiments, the projection apparatus 230 may be a projector, a short-throw projector, or one with similar functions, but the disclosure is not limited thereto.

A multimedia image 240 may include multiple parts, such as a first multimedia image 240A and a second multimedia image 240B. The first projection apparatus 230A projects the first multimedia image 240A of the multimedia image 240 onto the first planar projection surface 110A, and the second projection apparatus 230B projects the second multimedia image 240B of the multimedia image 240 onto the second planar projection surface 110B. In some embodiments, the multimedia image 240 may be a multimedia image of one or more of a video and an image, but the disclosure is not limited thereto.

When the first projection apparatus 230A projects the first multimedia image 240A onto the first planar projection surface 110A, and the second projection apparatus 230B projects the second multimedia image 240B onto the second planar projection surface 110B, the first multimedia image 240A and the second multimedia image 240B may respectively be independent multimedia images, causing the images between the first multimedia image 240A and the second multimedia image 240B to be incoherent.

Therefore, the controller 300 controls the first projection apparatus 230A and the second projection apparatus 230B, so that the first multimedia image 240A and the second multimedia image 240B are connected to form a continuous image 250A, so that the images of the continuous image 250A appear coherent.

In another embodiment, the first projection apparatus 230A projects the first multimedia image 240A of the multimedia image 240 onto the first planar projection surface 110A and the second planar projection surface 110B, and the second projection apparatus 230B projects the second multimedia image 240B of the multimedia image 240 onto the second planar projection surface 110B. In other words, the first multimedia image 240A may simultaneously span the first planar projection surface 110A and the second planar projection surface 110B.

When the first projection apparatus 230A projects the first multimedia image 240A onto the first planar projection surface 110A and the second planar projection surface 110B, and the second projection apparatus 230B projects the second multimedia image 240B onto the second planar projection surface 110B, the first multimedia image 240A and the second multimedia image 240B may be coherent into one multimedia image or may respectively be independent multimedia images, causing the images to be incoherent between the first multimedia image 240A and the second multimedia image 240B.

Therefore, the controller 300 controls the first projection apparatus 230A, so that the first multimedia image 240A is connected between the first planar projection surface 110A and the second planar projection surface 110B, and the first multimedia image 240A and the second multimedia image 240B are connected on the second planar projection surface 110B to form the continuous image 250A, so that the images of the continuous image 250A appear coherent.

Specifically, the controller 300 is connected to the first projection apparatus 230A and the second projection apparatus 230B with the communication device 310. In some embodiments, the communication device 310 may be connected to the first projection apparatus 230A and the second projection apparatus 230B using a wired network, a wireless network, Bluetooth communication, or others with similar functions to control the transmission of the multimedia images to the first projection apparatus 230A and the second projection apparatus 230B. The communication device 310 may also be connected to the Internet to receive a command from an external device or transmit a result after execution to the external device. The external device may be a desktop computer, a notebook computer, a tablet computer, a smart phone, or an input device with similar functions.

The controller 300 further includes the processor 320 and the cloud central processing system 330. The processor 320 is electrically connected to the communication device 310 and the cloud central processing system 330. The processor 320 may provide the function of connecting the cabin 100 to the Internet by being connected to the communication device 310.

In addition, the processor 320 may issue a command to the cloud central processing system 330 by being connected to the communication device 310 and the cloud central processing system 330. The cloud central processing system 330 determines the contents of the multimedia images 240 according to the command of the processor 320, and transmits the multimedia images 240 to the display system 210 via the communication device 310, and the multimedia images 240 are projected onto the first planar projection surface 110A and the second planar projection surface 110B via the first projection apparatus 230A and the second projection apparatus 230B, and are merged into the continuous image 250A.

In some embodiments, the processor 320 may be a central processing unit (CPU), a microprocessor, or an element with similar functions. In some embodiments, the cloud central processing system 330 may be a cloud server, wherein a large number of multimedia images are stored in the cloud server or a large number of multimedia images may be accessed by the Internet.

By forming the continuous image 250A, the user in the cabin 100 may see the continuous image 250A composed of the second multimedia image 240B and the first multimedia image 240A sequentially spanning the second planar projection surface 110B located on the side wall 102 and the first planar projection surface 110A located on the side wall 101, so that the user can see larger and more continuous multimedia images to generate a better user experience.

Figure 4:
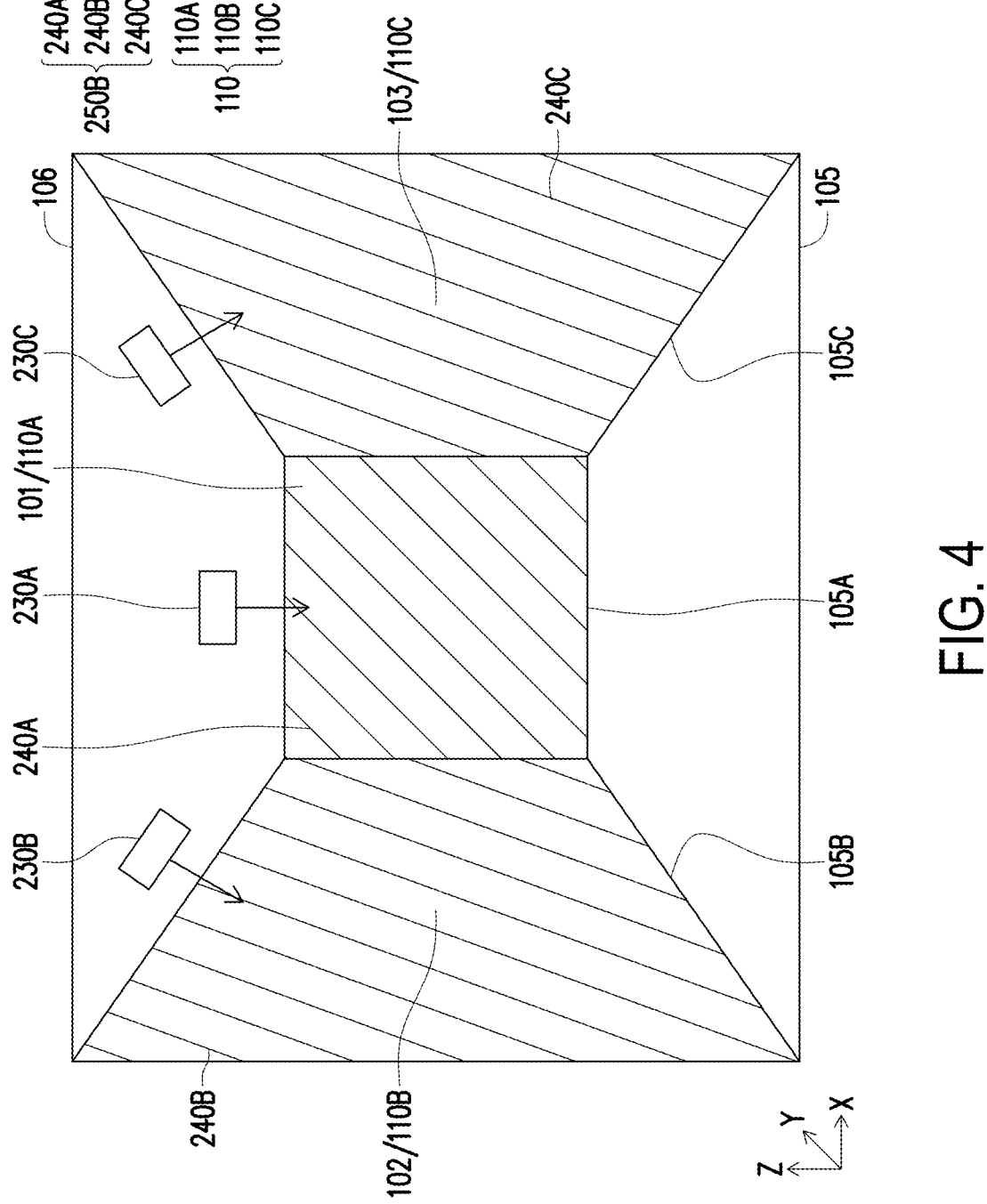

FIG. 4 is a schematic diagram of a smart space system according to an embodiment of the disclosure. The cabin 100 shown in FIG. 4 is similar to FIG. 3, so the similarities will not be described again. Compared with FIG. 3, in the embodiment shown in FIG. 4, in addition to the first planar projection surface 110A and the second planar projection surface 110B, the at least two planar projection surfaces further include a third planar projection surface 110C.

As shown in FIG. 4, the third planar projection surface 110C is located on the side wall 103. Specifically, the third planar projection surface 110C is located on a surface of the side wall 103 located inside the cabin 100. A bottom portion of the third planar projection surface 110C is connected to a third side 105C connected to the first side 105A of the bottom surface 105. In other words, the third planar projection surface 110C extends downward to the bottom surface 105. In addition, the third planar projection surface 110C is connected to the first planar projection surface 110A.

As shown in FIG. 4, in addition to the first projection apparatus 230A and the second projection apparatus 230B, the projection apparatus 230 further includes a third projection apparatus 230C corresponding to the third planar projection surface 110C. In the embodiment shown in FIG. 4, the third projection apparatus 230C is disposed on the top surface 106 to prevent interfering with the images projected onto the third planar projection surface 110C. In other embodiments, the third projection apparatus 230C may also be disposed at other suitable positions. For example, the third projection apparatus 230C may be disposed on a top portion of the side surface 103 and may project downward onto the third planar projection surface 110C.

In the embodiment shown in FIG. 4, the multimedia image 240 may include multiple parts. For example, in addition to the first multimedia image 240A and the second multimedia image 240B, the multimedia image 240 may further include a third multimedia image 240C. The third projection apparatus 230C projects the third multimedia image 240C of the multimedia image 240 onto the third planar projection surface 110C.

When the first projection apparatus 230A projects the first multimedia image 240A onto the first planar projection surface 110A, the second projection apparatus 230B projects the second multimedia image 240B onto the second planar projection surface 110B, and the third projection apparatus 230C projects the third multimedia image 240C onto the third planar projection surface 110C, the first multimedia image 240A, the second multimedia image 240B, and the third multimedia image 240C may respectively be independent multimedia images, causing the images between the first multimedia image 240A, the second multimedia image 240B, and the third multimedia image 240C to be incoherent.

Therefore, the controller 300 controls the first projection apparatus 230A, the second projection apparatus 230B, and the third projection apparatus 230C, so that the first multimedia image 240A, the second multimedia image 240B, and the third multimedia image 240C are connected to form a continuous image 250B, so that the images of the continuous image 250B appear coherent. By forming the continuous image 250B, the user in the cabin 100 may see the continuous image 250B composed of the second multimedia image 240B, the first multimedia image 240A, and the third multimedia image 240C sequentially spanning the second planar projection surface 110B located on the side wall 102, the first planar projection surface 110A located on the side wall 101, and the third planar projection surface 110C located on the side wall 103, so that the user can see larger and more continuous multimedia images to generate a better user experience.

Particularly, in the embodiment shown in FIG. 4, a continuous image 250C sequentially surrounds the side walls 102, 101, and 103 of the cabin 100. Therefore, when the user stands in the cabin 100 and faces the side wall 101, the continuous image seen by the user cover more than 180 degrees of the viewing angle of the user.

Figure 5:
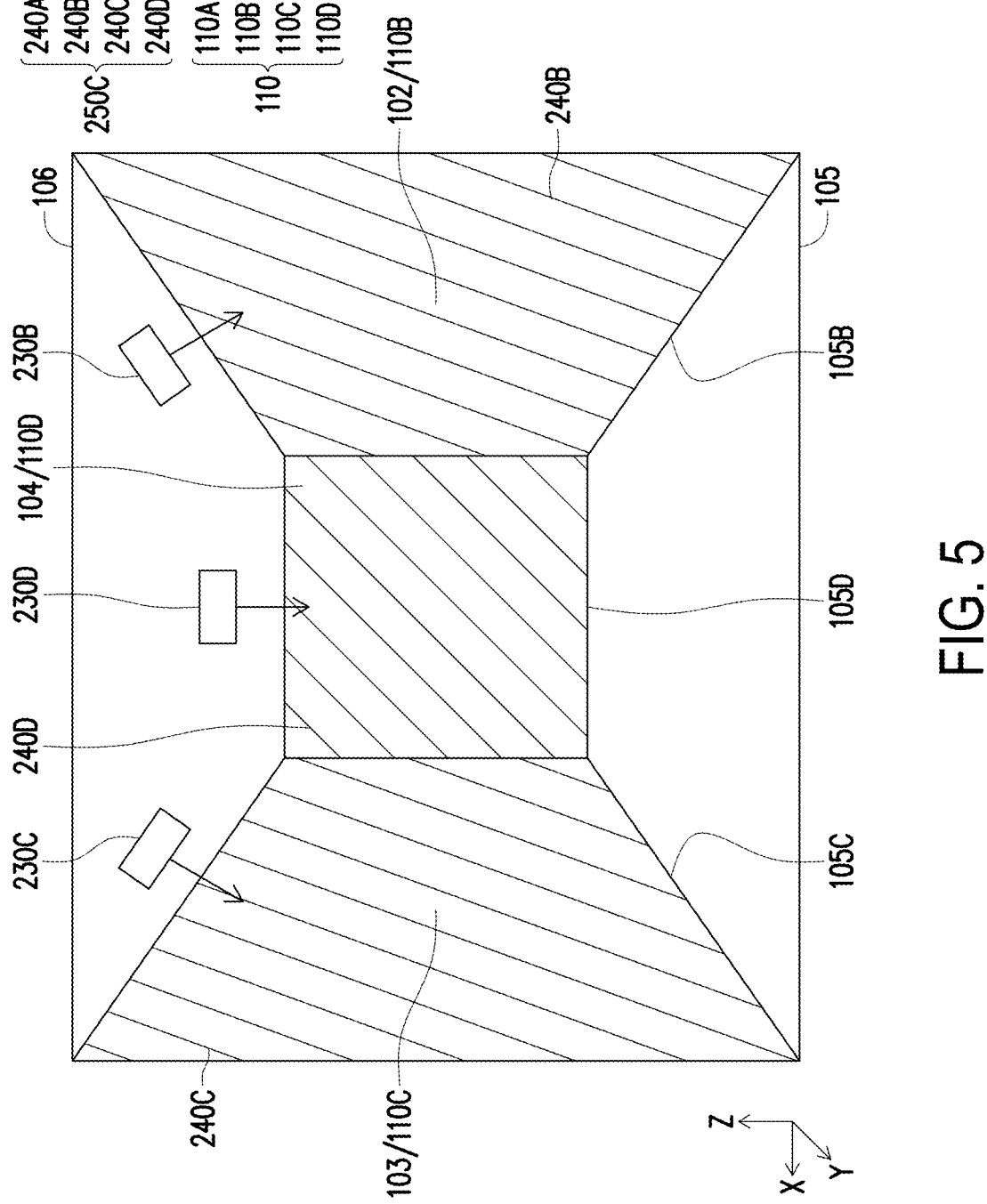

FIG. 5 is a schematic diagram of a smart space system according to an embodiment of the disclosure. The cabin 100 shown in FIG. 5 is similar to FIG. 4, so the similarities will not be described again. Compared with FIG. 4, FIG. 5 shows a viewing angle different from FIG. 4, so the side wall 101 is not shown. However, in FIG. 5, the relative positions of the side wall 101, the side walls 102 and 103, and other elements are the same as those shown in FIG. 4.

In the embodiment shown in FIG. 5, the at least two planar projection surfaces include a fourth planar projection surface 110D in addition to the first planar projection surface 110A, the second planar projection surface 110B, and the third planar projection surface 110C.

As shown in FIG. 5, the fourth planar projection surface 110D is located on the side wall 104. Specifically, the fourth planar projection surface 110D is located on a surface of the side wall 104 located inside the cabin 100. A bottom portion of the fourth planar projection surface 110D is connected to a fourth side 105D of the bottom surface 105, wherein the fourth side 150D is respectively connected to the second side 105B and the third side 105C. In other words, the fourth planar projection surface 110D extends downward to the bottom surface 105. In addition, the fourth planar projection surface 110D is respectively connected to the second planar projection surface 110B and the third planar projection surface 110C.

As shown in FIG. 5, in addition to the first projection apparatus 230A, the second projection apparatus 230B, and the third projection apparatus 230C, the projection apparatus 230 further includes a fourth projection apparatus 230D corresponding to the fourth planar projection surface 110DC. In the embodiment shown in FIG. 5, the fourth projection apparatus 230D is disposed on the top surface 106 to prevent interfering with the images projected onto the fourth planar projection surface 110D. In other embodiments, the fourth projection apparatus 230D may also be disposed at other suitable positions. For example, the fourth projection apparatus 230D may be disposed on a top portion of the side surface 104 and may project downward onto the fourth projection apparatus 230D.

In the embodiment shown in FIG. 5, the multimedia image 240 may include multiple parts. For example, in addition to the first multimedia image 240A, the second multimedia image 240B, and the third multimedia image 240C, the multimedia image 240 further includes a fourth multimedia image 240D. The fourth projection apparatus 230D projects the fourth multimedia image 240D of the multimedia image 240 onto the fourth planar projection surface 110D.

In the embodiments of FIG. 3 to FIG. 5, the material of the first screen 110, that is, the materials of the first planar projection surface 110A, the second planar projection surface 110B, the third planar projection surface 110C, and the fourth planar projection surface 110D included in the first screen, includes glass, glass with adjustable transparency, wood, and metal. In some embodiments, the materials of the first planar projection surface 110A, the second planar projection surface 110B, the third planar projection surface 110C, and the fourth planar projection surface 110D may be the same or different materials, but the disclosure is not limited thereto. Therefore, the multimedia images may be projected onto the planar projection surfaces of the first screen with various different materials to be suitable for diverse projection environments.

When the first projection apparatus 230A projects the first multimedia image 240A onto the first planar projection surface 110A, the second projection apparatus 230B projects the second multimedia image 240B onto the second planar projection surface 110B, the third projection apparatus 230C projects the third multimedia image 240C onto the third planar projection surface 110C, and the fourth projection apparatus 230D projects the fourth multimedia image 240D onto the fourth planar projection surface 110D, the first multimedia image 240A, the second multimedia image 240B, the third multimedia image 240C, and the fourth multimedia image 240C may respectively be independent multimedia images, causing the images between the first multimedia image 240A, the second multimedia image 240B, the third multimedia image 240C, and the fourth multimedia image 240D to be incoherent.

Therefore, the controller 300 controls the first projection apparatus 230A, the second projection apparatus 230B, the third projection apparatus 230C, and the fourth projection apparatus 230D, so that the first multimedia image 240A, the second multimedia image 240B, the third multimedia image 240C, and the fourth multimedia image 240D are connected to form a continuous image 250C, so that the images of the continuous image 250C appear coherent. By forming the continuous image 250C, the user in the cabin 100 may see the continuous image 250C composed of the second multimedia image 240B, the first multimedia image 240A, the third multimedia image 240C, and the fourth multimedia image 240D sequentially spanning the second planar projection surface 110B located on the side wall 102, the first planar projection surface 110A located on the side wall 101, the third planar projection surface 110C located on the side wall 103, and the fourth planar projection surface 110D located on the side wall 104, so that the user can see larger and more continuous multimedia images to generate a better user experience.

Particularly, in the embodiment shown in FIG. 5, the continuous image 250C sequentially surrounds all the side walls 102, 101, 103, and 104 of the cabin 100. Therefore, the continuous image 250C may surround the user 360 degrees without interruption.

In another embodiment, in addition to being located on the side surface of the cabin, the continuous image provided by the smart space system may further extend to the bottom surface or the top surface of the cabin, creating a more complete continuous image.

Figure 6:
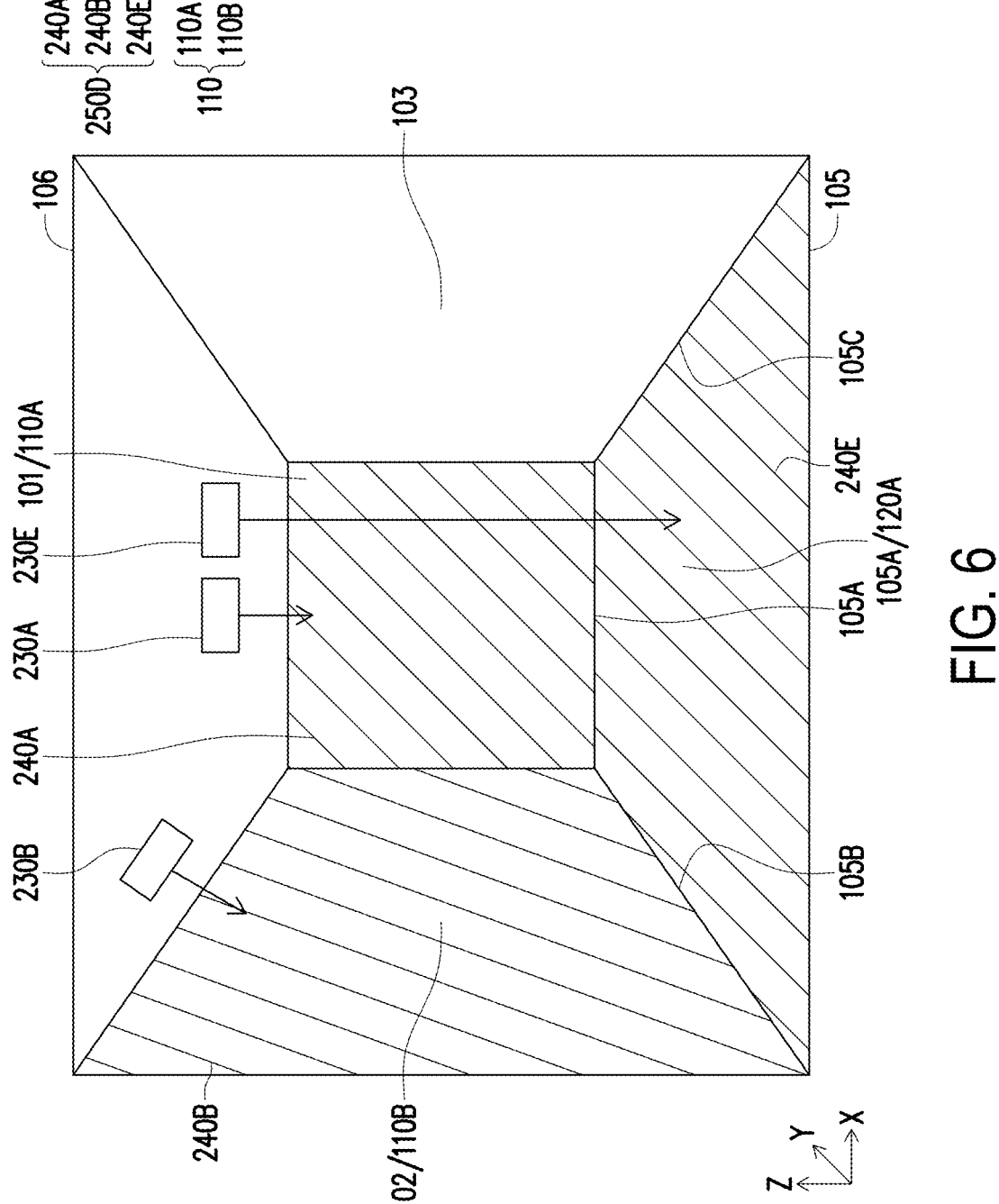

FIG. 6 is a schematic diagram of a smart space system according to an embodiment of the disclosure. The cabin 100 shown in FIG. 6 is similar to FIG. 3, so the similarities will not be described again. Compared with FIG. 3, in the embodiment shown in FIG. 6, the cabin 100 further includes a second screen 120, and the second screen 120 is connected to the first screen 110. In the embodiment, the second screen 120 is located on the bottom portion 105 of the cabin 100. In other embodiments, the second screen 120 may also be located on the top portion 106 of the cabin 100, but the disclosure is not limited thereto.

In the embodiment shown in FIG. 6, the second screen 120 includes a fifth planar projection surface 120A. The bottom portion of the first planar projection surface 110A is connected to the first side 105A of the fifth planar projection surface 120A, and the bottom portion of the second planar projection surface 110B is connected to the second side 105B connected to the first side 105A of the fifth planar projection surface 120A. In other words, the fifth planar projection surface 120A is respectively connected to the first planar projection surface 110A and the second planar projection surface 110B of the first screen.

As shown in FIG. 6, in addition to the first projection apparatus 230A and the second projection apparatus 230B, the projection apparatus 230 further includes a fifth projection apparatus 230E corresponding to the fifth planar projection surface 120A. In the embodiment shown in FIG. 6, the fifth projection apparatus 230E is disposed on the top surface 106 to prevent interfering with images projected onto the fifth planar projection surface 120A. In other embodiments, the fifth projection apparatus 230E may also be disposed at other suitable positions. For example, the fifth projection apparatus 230E may be disposed on a top portion of any of the side surfaces 101, 102, 103, and 104 and may project downward onto the fifth planar projection surface 120A.

In other embodiments, if the fifth planar projection surface 120A is located on the top surface 106 (not shown), the corresponding fifth projection apparatus 230E may be disposed on a bottom portion of any of the side surfaces 101, 102, 103, and 104 and may project upward onto the fifth planar projection surface 120A located on the top surface 106 or may be disposed on the bottom surface 105 at a suitable position that does not affect the movement of the user.

In the embodiment shown in FIG. 6, the multimedia image 240 may include multiple parts. For example, in addition to the first multimedia image 240A and the second multimedia image 240B, the multimedia image 240 further includes a fifth multimedia image 240E. The fifth projection apparatus 230E projects the fifth multimedia image 240E of the multimedia image 240 onto the fifth planar projection surface 120A.

When the first projection apparatus 230A projects the first multimedia image 240A onto the first planar projection surface 110A, the second projection apparatus 230B projects the second multimedia image 240B onto the second planar projection surface 110B, and the fifth projection apparatus 230E projects the fifth multimedia image 240E onto the fifth planar projection surface 120A, the first multimedia image 240A, the second multimedia image 240B, and the fifth multimedia image 240E may respectively be independent multimedia images, causing the images between the first multimedia image 240A, the second multimedia image 240B, and the fifth multimedia image 240E to be incoherent.

Therefore, the controller 300 controls the first projection apparatus 230A, the second projection apparatus 230B, and the fifth projection apparatus 230E, so that the first multimedia image 240A, the second multimedia image 240B, and the fifth multimedia image 240E are connected to form a continuous image 250D, so that the images of the continuous image 250D appear coherent.

Specifically, the controller 300 controls the first projection apparatus 230A and the second projection apparatus 230B to form a continuous image located on the side wall of the cabin in a method similar to that shown in FIG. 3. The controller 300 then connects the continuous image to the fifth multimedia image 240E located on the fifth planar projection surface 120A to form the continuous image 250D.

By forming the continuous image 250D, the user in the cabin 100 may see the continuous image 250B composed of the second multimedia image 240B, the first multimedia image 240A, and the fifth multimedia image 240E sequentially spanning the second planar projection surface 110B located on the side wall 102, the first planar projection surface 110A located on the side wall 101, and the fifth planar projection surface 120A extending toward the bottom surface 105, so that the user can not only see the multimedia images located on the side walls, but also see the continuous image extending to a different direction (for example, the bottom surface) to generate a better user experience.

In the embodiment shown in FIG. 6, without loss of generality, the first screen may also include the first planar projection surface 110A, the second planar projection surface 110B, and the third planar projection surface 110C as shown in FIG. 4 or include the first planar projection surface 110A, the second planar projection surface 110B, the third planar projection surface 110C, and the fourth planar projection surface 110D as shown in FIG. 5. In this case, the continuous image may be formed in a manner similar to FIG. 6.

In the embodiments shown in FIG. 2 to FIG. 6, all the side walls of the cabin 100 are planar. However, in other embodiments, at least one side wall of the cabin may not be planar.

Figure 7:
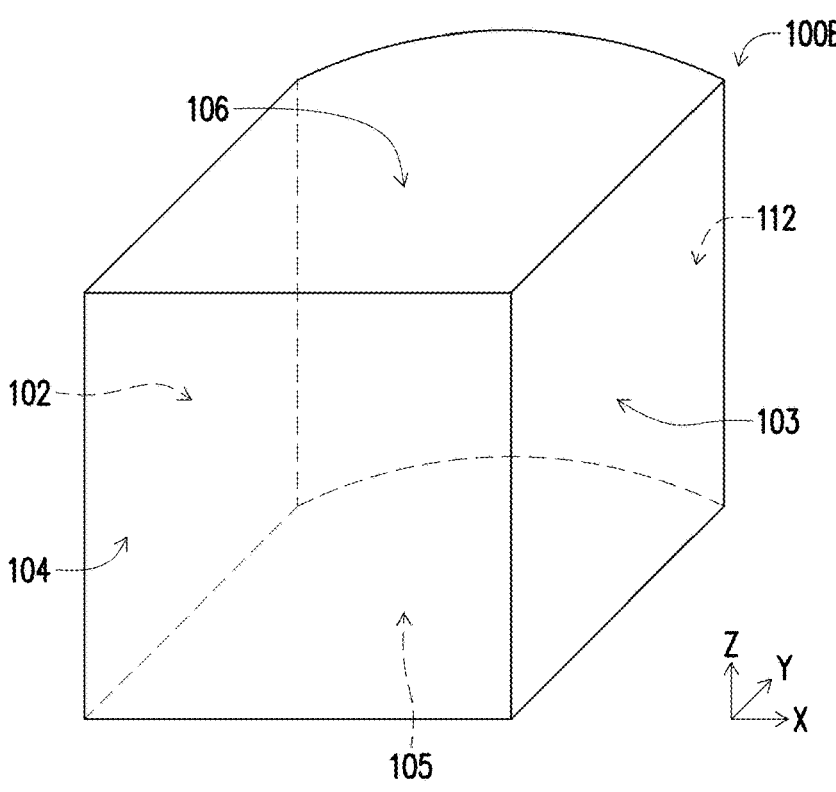

FIG. 7 is a schematic diagram of a smart space system according to an embodiment of the disclosure. Please refer to FIG. 7. A cabin 100B shown in FIG. 7 is similar to the cabin 100 shown in FIG. 2. The difference is that in the cabin 100B shown in FIG. 7, the first screen includes a curved projection surface 112 located at a position corresponding to a side wall (for example, the side wall 101) of the cabin 100 shown in FIG. 2. A bottom portion of the curved projection surface 112 is connected to at least one side of the bottom surface 105. In addition, corresponding to the curved projection surface 112, the bottom surface 105 and the top surface 106 also respectively have a curved side to correspond to the curved projection surface. Therefore, in the embodiment, the first screen may be various curved surfaces. In other embodiments, the first screen may also have more curved projection surfaces. For example, at least one, two, or all of the side surfaces 102, 103, and 104 of the cabin 100B are replaced with curved projection surfaces, so that the smart space system may be applied to more diverse environments to generate a better user experience.

In addition, in the embodiment shown in FIG. 7, the first screen including the curved projection surface 112 of the cabin 100B may also be combined with the second screen located on the bottom surface 105 or the top surface 106 to combine the multimedia images located on the first screen and the second screen to form a continuous image.

Figures 8, 9:
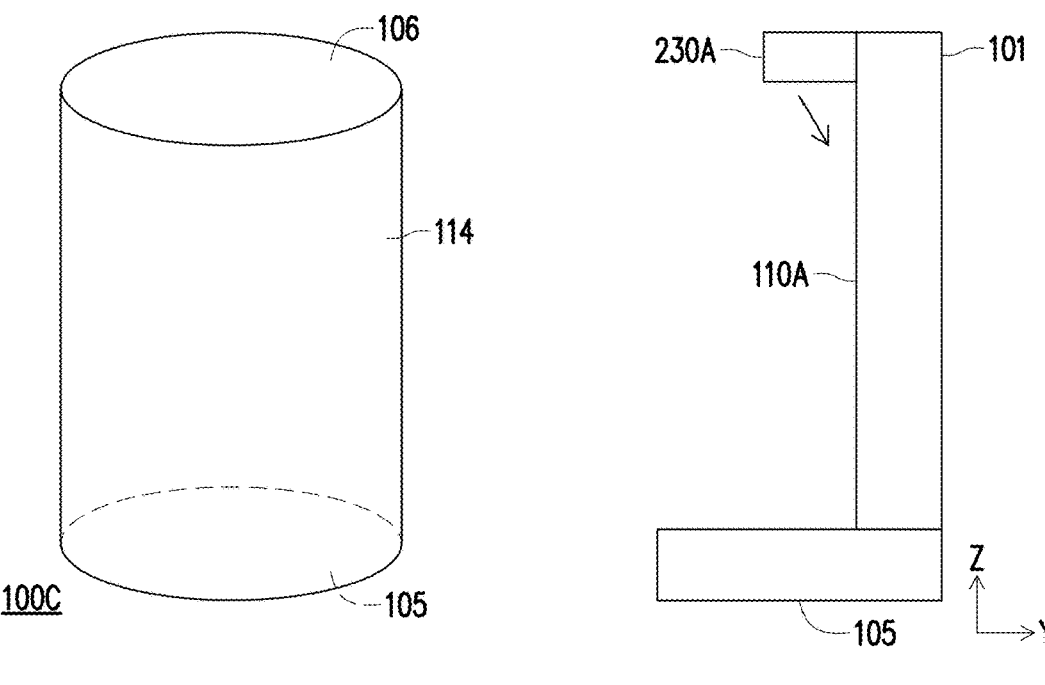

FIG. 8 is a schematic diagram of a smart space system according to an embodiment of the disclosure. A cabin 100C shown in FIG. 8 is similar to the cabin 100 shown in FIG. 2. The difference is that in the cabin 100C shown in FIG. 8, the first screen 110 includes an annular projection surface 114, wherein a bottom portion of the annular projection surface 114 is connected to a side of the bottom surface 105. Specifically, the annular projection surface 114 is located at a position corresponding to the side walls 101, 102, 103, and 104 of the cabin 100 shown in FIG. 2, wherein the bottom portion of the annular projection surface 114 is connected to the side of the bottom surface 105. Therefore, in the embodiment, the first screen may be various curved surfaces, so that the smart space system may be applied to more diverse environments to generate a better user experience.

In addition, in the embodiment shown in FIG. 8, the first screen including the annular projection surface 114 of the cabin 100C may also be combined with the second screen located on the bottom surface 105 or the top surface 106 to combine the multimedia images located on the first screen and the second screen to form a continuous image.

In the embodiments shown in FIG. 3 to FIG. 6, the cabin 100 includes the imaging device 220. The imaging device 220 includes at least one projection apparatus (for example, the projection apparatuses 230A, 230B, 230C, and 230D) configured to project the multimedia images onto multiple planar projection surfaces (for example, the planar projection surfaces 110A, 110B, 110C, and 110D) of the first screen. In order for the user to have a better user experience, the projection apparatuses must be placed at suitable positions.

FIG. 9 is a schematic diagram of a smart space system according to an embodiment of the disclosure. Please refer to FIG. 9. Without loss of generality, FIG. 9 takes the first projection apparatus 230A and the first planar projection surface 110A as an example, but the other projection apparatuses 230B, 230C, and 230D may also be applied.

As shown in FIG. 9, FIG. 9 is a side view of the side wall 101 of the cabin 100. The side wall 101 is connected to the bottom surface 105. Different from what is shown in FIG. 3 to FIG. 6, in the embodiment, the first projection apparatus 230A is located on a top portion of the side wall 101 and irradiates downward to project the multimedia images onto the planar projection surface 110A located on the side wall 101 inside the cabin 100. In other words, the first projection apparatus 230A is located inside the cabin 100, so the first projection apparatus 230A may directly project onto the first planar projection surface 110A. The first projection apparatus 230A is also disposed on at least one of the at least two planar projection surfaces, that is, the first planar projection surface 110A, of the first screen 110. Therefore, the distance between the first projection apparatuses 230A may be reduced, so that when the first projection apparatuses 230A project the multimedia images onto the first planar projection surface 110A, interference from the external environment can be reduced.

In addition to forming the multimedia images into the continuous image on the first screen and the second screen formed by the side wall and/or the bottom surface (or the top surface), the smart space system of the disclosure may also interact with the user to generate a better user experience.

Figure 10:
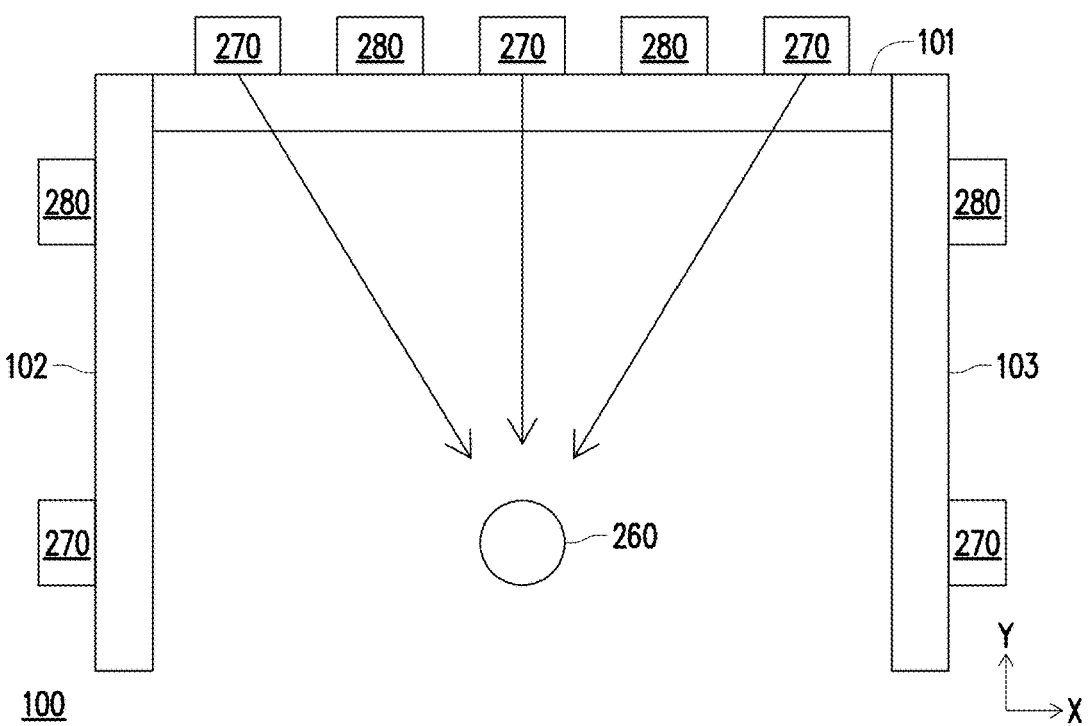

FIG. 10 is a schematic diagram of a smart space system according to an embodiment of the disclosure. Please refer to FIG. 10. The interactive human-machine interface 200 further includes the head-mounted display device 260, the first lens module 270, and the motion capture module 280.

The head-mounted display device 260 is worn by the user located in the cabin 100. The head-mounted display device 260 may generate various images and include, for example, the function of augmented reality, mixed reality, virtual reality, or a combination thereof. In some embodiments, the head-mounted display device 260 may be a helmet-type display, a glasses-type display, or others with similar functions, but the disclosure is not limited thereto. A virtual image generated by the head-mounted display device 260 is combined with the continuous image displayed in the cabin 100 to enhance the user experience of the user.

The first lens modules 270 of the interactive human-machine interface 200 are disposed in the cabin 100 and are signal-connected to the controller 300 to track the position of the head-mounted display device 260. As shown in FIG. 10, the cabin 100 includes the first lens modules 270 therein, which are respectively disposed on the side walls 101, 102, 103 and 104 (not shown). In some embodiments, the number of the first lens modules 270 is greater than or equal to 1, and the number of the first lens modules 270 depends on actual requirements. Since the user wears the head-mounted display device 260 and moves freely in the cabin 100, after the first lens modules 270 capture images of the head-mounted display device 260, the images may be transmitted to the controller 300 to calculate the precise position of the head-mounted display device 260 (that is, the user) in the cabin. The controller 300 may also correspondingly change the continuous image displayed on the first screen and the second screen according to the position of the head-mounted display device 260.

The motion capture modules 280 of the interactive human-machine interface 200 are disposed in the cabin 100 and are signal-connected to the controller 300 to track the motion of the user, such as the hand motion of the user, but not limited thereto. As shown in FIG. 10, the cabin 100 includes the motion capture modules 280 therein, which are respectively disposed on the side walls 101, 102, 103, and 104 (not shown). In some embodiments, the number of the motion capture modules 280 is greater than or equal to 1, and the number of the motion capture modules 280 depends on actual requirements. In some embodiments, the motion capture module 280 may be a millimeter wave radar or a camera, and the camera may be a visible light camera, an invisible light camera, or one with similar functions, but the disclosure is not limited thereto.

Since the user may move freely within the cabin 100 and may interact with the images according to the continuous image viewed, after the motion capture module 280 captures the motion of the user to be used to capture a movement trajectory of a target, such as capturing the movement trajectory of the hand of the user, a motion capture result is generated. The motion capture module 280 signal-transmits the motion capture result to the controller 300. The controller 300 correspondingly changes the multimedia images 240 of the imaging device 220 according to the motion capture result, and correspondingly changes the continuous image displayed on the first screen and the second screen. For example, if the continuous image is based on a library scene, the continuous image displayed on the first screen and the second screen may be correspondingly changed according to the hand motion captured by the motion capture module 280 to, for example, generate a motion such as turning pages of a book or picking a book.

On the other hand, according to a motion capture signal detected by the motion capture module 280, the controller 300 may move or rotate the continuous image located on the first screen and/or the second screen. Taking FIG. 6 as an example, on the first screen 110 and the second screen 120, the continuous image 250D may move along a first direction X perpendicular to a normal line of the bottom surface 105, may move along a second direction Y perpendicular to the normal line of the bottom surface 105 and perpendicular to the first direction X, may move along a third direction Z parallel to the normal line of the bottom surface 105, or respectively rotate along the first direction, the second direction, or the third direction to adjust the viewing angle between the user and the continuous image, so as to enhance the user experience.

Figure 11:
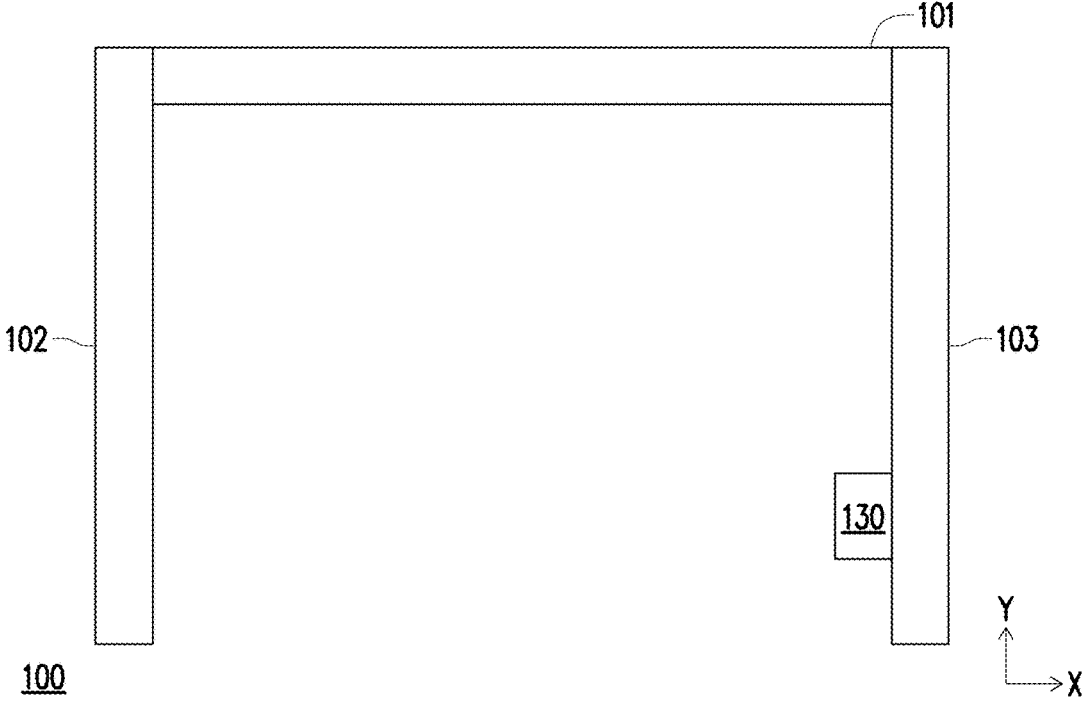

FIG. 11 is a schematic diagram of a smart space system according to an embodiment of the disclosure. Please refer to FIG. 11. The cabin 100 further includes a desktop 130. The desktop 130 is located inside the cabin 100 and is connected to the bottom surface 105 or the first screen. The desktop 130 may be a foldable desktop or may also be a fixed desktop. The desktop 130 is electrically connected to the processor 320 of the controller 300 through a connection port (not shown) located on the bottom surface 105 or located on the first screen. The user may use the desktop 130 to input a command to the processor 320 in the controller 300 to change the status of the controller 300 or to view the status of the controller 300. The desktop 130 may include a display and an input device or may be externally connected to a device such as a desktop computer, a notebook computer, and a tablet computer, but the disclosure is not limited thereto.

In summary, the smart space system provided by the disclosure may span the side walls and the bottom surface of the cabin to form a seamless continuous image. The user may also interact with the continuous image, such as translating or rotating the continuous image with the motion of the user, so that the user can obtain a better user experience in the smart space system.

What is claimed is:

1. A smart space system, comprising:
a cabin, comprising:
    a bottom surface; and
    a first screen, located on a side wall of the cabin and connected to the bottom surface;
an interactive human-machine interface, comprising:
    a display system, having an imaging device, wherein the imaging device is configured to project a plurality of multimedia images onto the first screen; and
a controller, signal-connected to the interactive human-machine interface to issue a control command to the interactive human-machine interface, so that the multimedia images are connected to form a first continuous image, so that images of the first continuous image appear coherent on the first screen,
wherein the first screen comprises: at least two planar projection surfaces, wherein the at least two planar projection surfaces comprise a first planar projection surface and a second planar projection surface,
wherein a bottom portion of the first planar projection surface is connected to a first side of the bottom surface,
wherein a bottom portion of the second planar projection surface is connected to a second side connected to the first side of the bottom surface, and the second planar projection surface is connected to the first planar projection surface.
2. The smart space system according to claim 1, wherein the imaging device comprises at least one projection apparatus, and the at least one projection apparatus comprises at least one first projection apparatus and a second projection apparatus, wherein the first projection apparatus projects a first multimedia image among the multimedia images onto the first planar projection surface and the second planar projection surface, and the second projection apparatus projects a second multimedia image among the multimedia images onto the second planar projection surface, wherein the controller controls the first projection apparatus and the second projection apparatus, so that the first multimedia image and the second multimedia image are connected to form the first continuous image.

3. The smart space system according to claim 2, wherein the at least two planar projection surfaces further comprise a third planar projection surface, wherein a bottom portion of the third planar projection surface is connected to a third side connected to the first side of the bottom surface, and the third planar projection surface is connected to the first planar projection surface, wherein the at least one projection apparatus further comprises a third projection apparatus, wherein the third projection apparatus projects a third multimedia image among the multimedia images onto the third planar projection surface, wherein the controller controls the first projection apparatus, the second projection apparatus, and the third projection apparatus, so that the first multimedia image, the second multimedia image, and the third multimedia image are connected to form the first continuous image.

4. The smart space system according to claim 3, wherein the at least two planar projection surfaces further comprise a fourth planar projection surface, wherein a bottom portion of the fourth planar projection surface is connected to a fourth side of the bottom surface, the fourth side is respectively connected to the second side and the third side, and the fourth planar projection surface is respectively connected to the second planar projection surface and the third planar projection surface, wherein the at least one projection apparatus further comprises a fourth projection apparatus, wherein the fourth projection apparatus projects a fourth multimedia image among the multimedia images onto the fourth planar projection surface, wherein the controller controls the first projection apparatus, the second projection apparatus, the third projection apparatus, and the fourth projection apparatus, so that the first multimedia image, the second multimedia image, the third multimedia image, and the fourth multimedia image are connected to form the first continuous image.

5. The smart space system according to claim 3, wherein the cabin further comprises a second screen located on the bottom portion of the cabin or a top portion of the cabin, and the second screen is connected to the first screen, wherein the second screen comprises a fifth planar projection surface, wherein the bottom portion of the first planar projection surface is connected to a first side of the fifth planar projection surface, wherein the bottom portion of the second planar projection surface is connected to a second side connected to the first side of the fifth planar projection surface, wherein the at least one projection apparatus comprises a fifth projection apparatus, wherein the fifth projection apparatus projects a fifth multimedia image among the multimedia images onto the fifth planar projection surface, wherein the controller controls the first projection apparatus, the second projection apparatus, and the fifth projection apparatus, so that the first multimedia image, the second multimedia image, and the fifth multimedia image are connected to form a second continuous image, so that images of the second continuous image appear coherent on the first screen and the second screen.

6. The smart space system according to claim 5, wherein on the first screen and the second screen, the fourth continuous image moves along a first direction perpendicular to a normal line of the bottom surface, moves along a second direction perpendicular to the normal line and perpendicular to the first direction, moves along a third direction parallel to the normal line, or respectively rotates along the first direction, the second direction, or the third direction.

7. The smart space system according to claim 2, wherein a part of the at least one projection apparatus is disposed on the first screen.

8. The smart space system according to claim 2, wherein a part of the at least one projection apparatus is disposed on at least one of the at least two planar projection surfaces.

9. The smart space system according to claim 1, wherein the first screen comprises: a curved projection surface, wherein a bottom portion of the curved projection surface is connected to a first side of the bottom surface.

10. The smart space system according to claim 1, wherein the first screen comprises: a full annular projection surface, wherein a bottom portion of the full annular projection surface is connected to a side of the bottom surface.

11. The smart space system according to claim 1, wherein a material of the first screen comprises glass, glass with adjustable transparency, wood, and metal.

12. The smart space system according to claim 1, wherein the interactive human-machine interface further comprises:

a head-mounted display device, comprises a function of augmented reality, mixed reality, virtual reality, or a combination thereof.

13. The smart space system according to claim 12, wherein the interactive human-machine interface further comprises:

at least one first lens module, disposed in the cabin and signal-connected to the controller to track a position of the head-mounted display device.

14. The smart space system according to claim 1, wherein the interactive human-machine interface further comprises:

a motion capture module, configured to capture a movement trajectory of a target to generate a motion capture result, wherein the motion capture module signal-transmits the motion capture result to the controller, and the controller correspondingly changes the multimedia images of the imaging device according to the motion capture result.

15. The smart space system according to claim 14, wherein the motion capture module comprises:

at least one millimeter wave radar or at least one camera.

16. The smart space system according to claim 1, wherein the controller comprises:

a communication device, configured to be communicatively connected to the interactive human-machine interface and an Internet;

a processor, electrically connected to the communication device and providing a function of connecting the cabin and the Internet;

a cloud central processing system, communicatively connected to the processor, wherein the cloud central processing system determines contents of the multimedia images according to a command of the processor, and transmits the multimedia images to the display system via the communication device.

17. The smart space system according to claim 1, wherein the cabin further comprises:

a desktop, connected to the bottom surface or the first screen, wherein the desktop is electrically connected to the controller to input a command to the controller to change a status of the controller.

\*   \*   \*   \*   \*